United States Patent
Peng

(10) Patent No.: US 9,578,147 B2
(45) Date of Patent: Feb. 21, 2017

(54) CASING AND PORTABLE ELECTRONIC DEVICE USING SAME

(71) Applicant: FIH (HONG KONG) LIMITED, Kowloon (HK)

(72) Inventor: Yung-Sung Peng, New Taipei (TW)

(73) Assignee: FIH (HONG KONG) LIMITED, Kowloon (HK)

( * ) Notice: Subject to any disclaimer, the term of this patent is extended or adjusted under 35 U.S.C. 154(b) by 0 days.

(21) Appl. No.: 14/560,431

(22) Filed: Dec. 4, 2014

(65) Prior Publication Data

US 2015/0264162 A1  Sep. 17, 2015

(30) Foreign Application Priority Data

Mar. 13, 2014  (TW) .............................. 103109053 A

(51) Int. Cl.
| | |
|---|---|
| *H04M 1/00* | (2006.01) |
| *H04M 1/02* | (2006.01) |
| *H04B 1/3888* | (2015.01) |
| *H04M 1/18* | (2006.01) |
| *G06F 1/16* | (2006.01) |

(52) U.S. Cl.
CPC ......... *H04M 1/0264* (2013.01); *H04B 1/3888* (2013.01); *H04M 1/185* (2013.01); *G06F 1/1626* (2013.01); *G06F 2200/1633* (2013.01); *H04M 1/0235* (2013.01); *H04M 1/0245* (2013.01)

(58) Field of Classification Search
CPC ............... B60R 21/0132; B60R 21/013; B60R 2021/01315;B60R 2021/01325; B60R 2021/0011; B60R 2021/0027; B60R 21/01558; B60R 19/483; B60R 2021/0006; H04W 4/22; G06F 1/1626; G06F 1/1677; G06F 2200/1633; G06F 2200/1634; G06F 1/1616; G06F 1/1622; G06F 1/1624; H04B 1/3888; H04B 15/02; H04M 1/0283; H04M 1/0235; H04M 1/0245; H04M 1/0214; H04M 1/0237; H04M 1/0264; H04M 1/72575
USPC ...................... 455/3.06, 556.1, 556.2, 575.1, 575.8,455/90.3, 575.4
See application file for complete search history.

(56) References Cited

U.S. PATENT DOCUMENTS

| | | | | |
|---|---|---|---|---|
| 7,747,007 B2* | 6/2010 | Hyun | ................... | G06F 1/1626 379/437 |
| 8,504,124 B2* | 8/2013 | Giustina | ............. | H04M 1/0235 455/575.1 |
| 2009/0312063 A1* | 12/2009 | Soto Nicolas | ...... | H04M 1/0268 455/566 |
| 2013/0109435 A1* | 5/2013 | McCaughey | .......... | H01Q 1/243 455/556.1 |

* cited by examiner

*Primary Examiner* — Olumide T Ajibade Akonai
(74) *Attorney, Agent, or Firm* — Zhigang Ma

(57) ABSTRACT

A casing includes a first portion, a second portion, and at least one sensor. The second portion is slidably engaged with the first portion. The at least one sensor is coupled to the first portion or the second portion, the sensor detects a distance between the first portion and the second portion. A portable electronic device using the casing is also provided.

14 Claims, 4 Drawing Sheets

CASING AND PORTABLE ELECTRONIC DEVICE USING SAME

FIELD

The present disclosure relates to a casing for portable electronic device, and particularly relates to a casing having a detecting utility for starting a camera module and a portable electronic device using the casing.

BACKGROUND

Portable electronic devices, such as smart phones, include a camera module. Due to the portable electronic devices becoming smaller, the camera module is actuated by a finger action on a touch screen of the portable electronic device, rather than a physical button arranged on the portable electronic device. However, it needs time to unlock the screen, start a camera application, and actuate the camera module by controlling the camera application. A best shooting chance may be missed when operating the steps above. Therefore, there is still improvement in the art that the camera module may be actuated faster by cooperating with other components of the portable electronic device, such as a casing.

BRIEF DESCRIPTION OF THE DRAWINGS

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
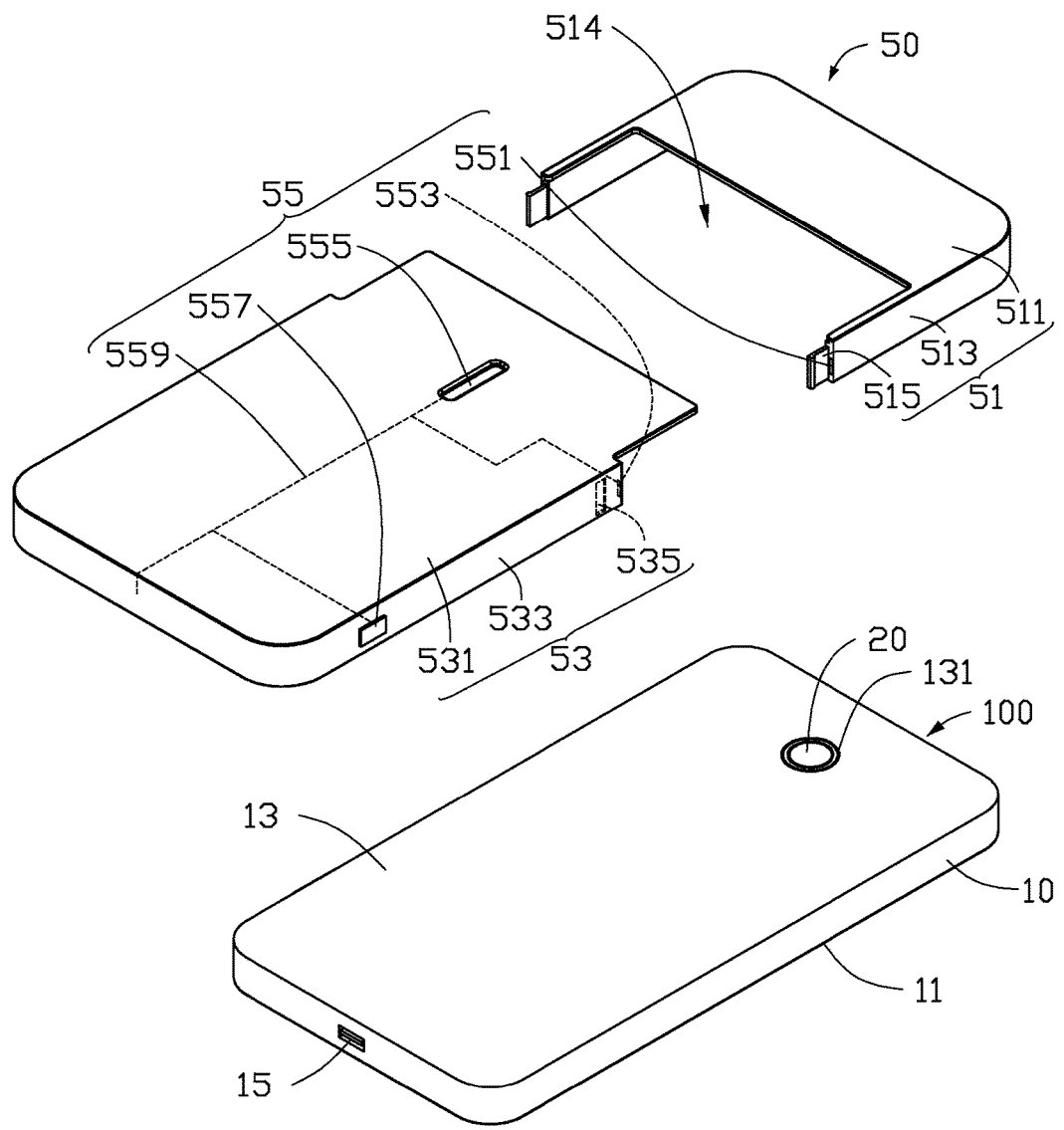
FIG. 1 is an exploded isometric view of an exemplary embodiment of a casing and a portable electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

Figure 2:
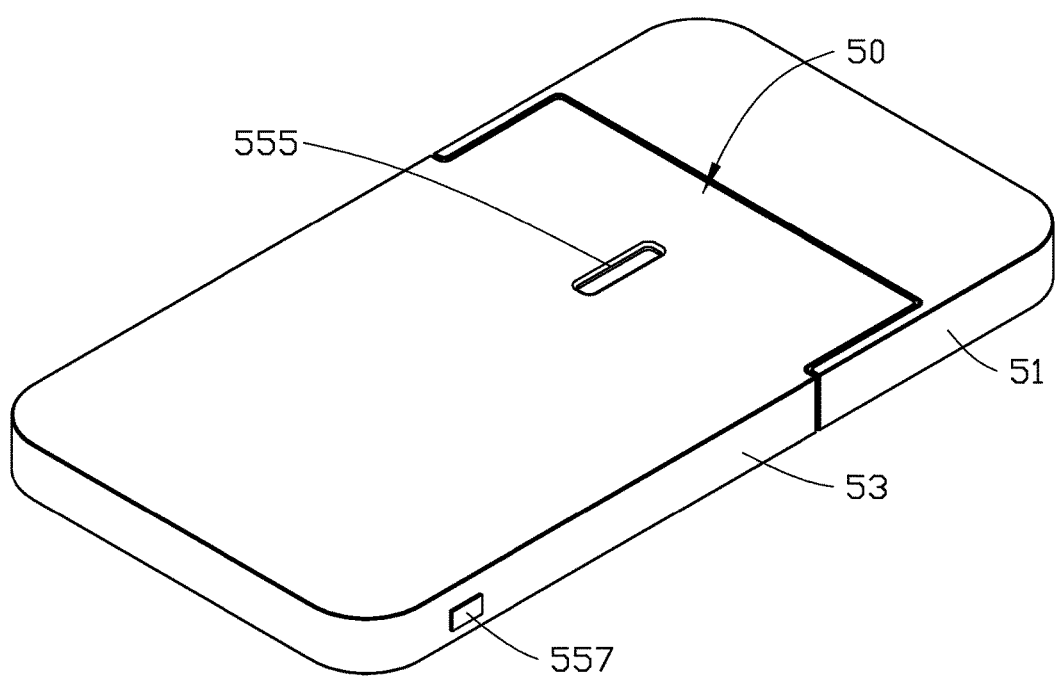
FIG. 2 is an assembled isometric view of the casing coupling to the portable electronic device.

FIGS. 1 and 2 illustrate at least one embodiment of a casing 50 coupling to a portable electronic device 100. The portable electronic device can be a smart phone or a tablet computer.

Figure 4:
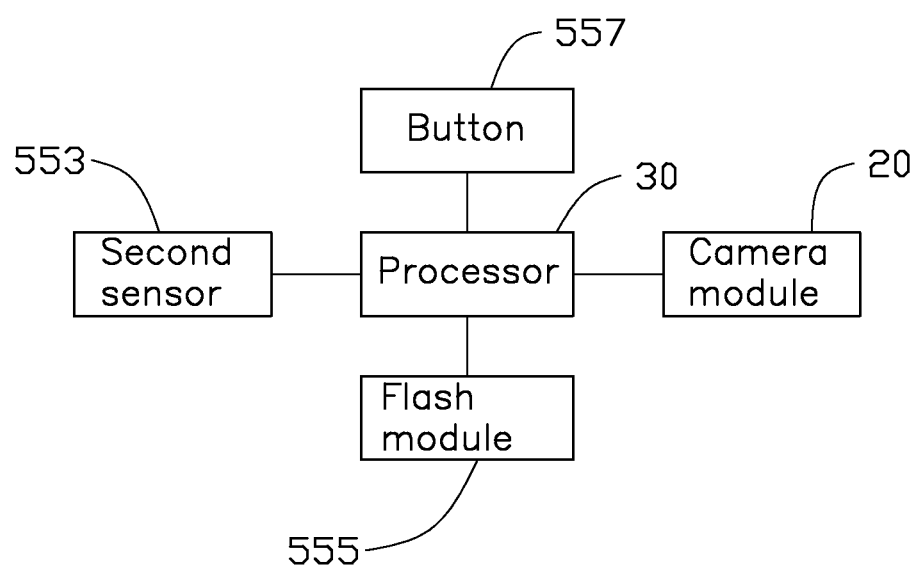
FIG. 4 is a block diagram of the casing and the portable electronic device.

FIGS. 1 and 4 illustrate that the portable electronic device 100 includes a body 10, a camera module 20, and a processor 30. The camera module 20 is mounted on the body 10 and is electrically connected to the processor 30. The body 10 includes a first side 11 and a second side 13. The first side 11 includes a screen (not shown) for displaying the information captured by the camera module 20 and other information of the portable electronic device 100. The second side 13 defines a hole 131, the camera module 20 is assembled on the body 10 and is exposed from the from the body 10 via the hole 131. The body 10 further defines a data interface 15 on one end for exchanging data with external devices.

The casing 50 is substantially a rectangular frame, which can be made of plastic, metal, or other materials. In one embodiment, the casing 50 is made of plastic and includes a first portion 51, a second portion 53, and functional component assembly 55. The second portion 53 is slidably coupled to the first portion 51, which can form different states for the casing 50. The functional component assembly 55 is mounted on the first portion 51 and the second portion 53 and is electrically connected to the processor 30.

The first portion 51 includes a first top wall 511, a first peripheral wall 513, and two latches 515. The first peripheral wall 513 is connected to a side of the first top wall 511, and has a longer length than the first top wall 511, thereby an opening 514 is defined between the first top wall 511 and the first peripheral wall 513. The two latches 515 extend from the first peripheral wall 513 and are located at two opposite sides of the opening 514.

The second portion 53 includes a second top wall 531, a second peripheral wall 533, and two slots 535. The second peripheral wall 533 is connected to a side of the second top wall 531, and has a shorter length than the second top wall 531. The two slots 535 are defined in two opposite ends of the second peripheral wall 533 and are aligned with the two latches 515. The two slots 535 are detachably engaged with the two latches 515, and the second top wall 531 extends into the opening 514, thereby the second portion 53 engages with the first portion 51.

The functional component assembly 55 includes a first sensor 551, a second sensor 553, a flash module 555, a button 557, and a connecting cable 559.

The first sensor 551 is mounted to the first peripheral wall 513 and is adjacent to the latch 515, the second sensor 553 is mounted to the second peripheral wall 533 and is adjacent to the slot 535, and the first sensor 551 is aligned with the second sensor 553. In one embodiment, the first sensor 551 and the second sensor 553 are both magnetic sensors and used for detecting a magnetic force, thereby determining a distance between the first portion 51 and a second portion 53. The magnetic force between the first sensor 551 and the second sensor 553 is inversely proportional to the distance between the two sensors 551, 553. When the casing 50 is closed, that is the first portion 51 is closed toward the second portion 53, the magnetic force between the first sensor 551 and the second sensor 553 achieves a maximum value; when the distance between the first sensor 551 and the second sensor 553 becomes larger, the magnetic force between the two sensors 551, 553 becomes weaker.

The flash module 555 is mounted on the second peripheral wall 531 for providing a flash light for the camera module 20. The flash module 555 is electrically connected to the processor 30 and controlled automatically according to the brightness of the photographing environment. The button 557 is mounted on a side of the second peripheral wall 513 for operation by the user for capturing images. The connecting cable 559 is arranged on the second top wall 531 and connecting the second sensor 553, the flash module 555, and the button 557 to the processor 30 via the data interface 15. In one embodiment, the connecting cable 559 is electrically connected to the processor 30 via the data interface 15 by, for example, extending a metal elastic piece for reaching the data interface 15 and thereby establishing electrical connection.

In other embodiments, a quantity of each of the latches 515 and the slots 535 can be just one. The latches 515 and the slots 535 can be replaced by other components, such as magnetic components or stick components for connecting the first portion 51 and the second portion 53.

In other embodiments, the first sensor 551 and the second sensor 553 can be replaced by other components, such as distance sensors for detecting the distance between the first portion 51 and the second portion 53. A quantity of the sensors can be just one, mounted on the first portion 51 or the second portion 53.

Figure 3:
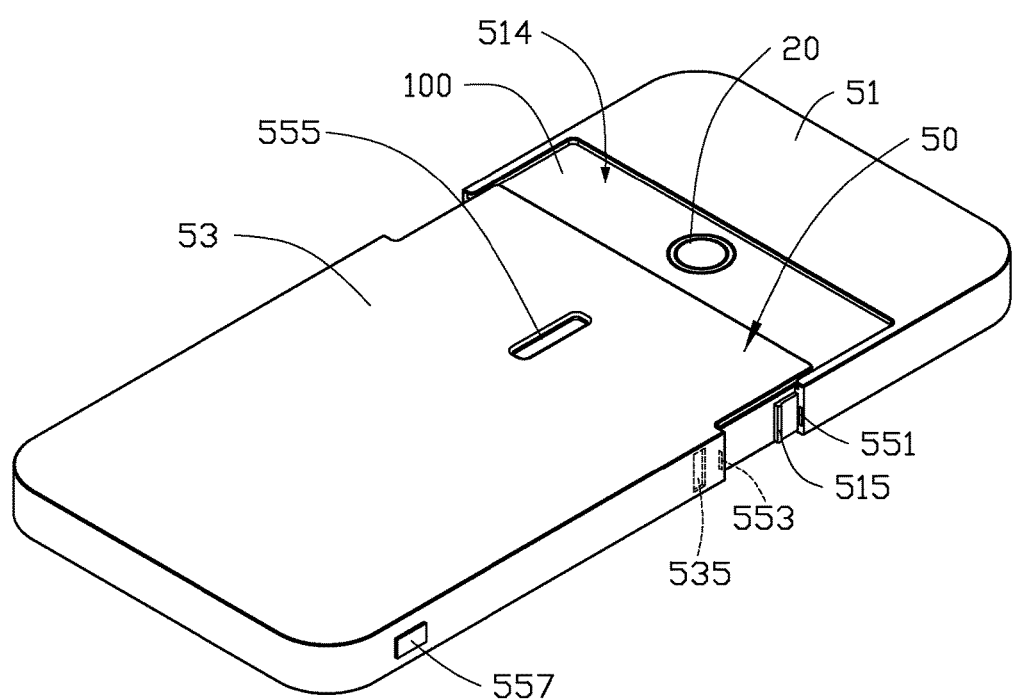
FIG. 3 is an isometric view of the casing in an open state on the portable electronic device.

FIGS. 3 and 4 illustrate that when the casing 50 is coupled to the second side 13 of the portable electronic device 100, the second sensor 553, the flash module 555, and the button 557 are electrically connected to the processor 30. The first portion 51 and the second portion 53 are latched together by the latches 515 latching to the slots 535. The first portion 51 covers the camera module 20 when the casing 50 is closed. When the camera module 20 is needed, the first portion 51 can be pushed by the user which slides away from the second portion 53. The magnetic force between the first portion 51 and the second portion 53 decreases as the distance increases, the second sensor 553 detects the magnetic signal and transmits to the processor 30, the processor 30 thereby determining whether to actuate the camera module 20 according to the magnetic signal. When the first portion 51 slides to a predetermined position that exposes the camera module 20, that is, the second sensor 553 detects a predetermined magnetic force value; the processor 30 actuates the camera module 20. Thereby the user can operate the button 557 to capture an image. After capturing an image, the first portion 51 can be pushed by the user to slide towards the second portion 53, and when the first portion 51 slides to cover the camera module 20, the processor 30 disables the camera module 20. The first portion 51 can be pushed until the latches 515 latch to the slots 535.

The casing 50 includes the first portion 51 and the second portion 53, and arranging the first sensor 551 and the second sensor 553 on the first portion 51 and the second portion 53, respectively. The second sensor 553 detects the distance changes between the first portion 51 and the second portion 53 and the processor thereby determines whether to actuate the camera module 20. By this way, the user can conveniently actuate the camera module 20 and shorten the operating time. In addition, the casing can be multi-functional besides protecting the portable electronic device 100.

It is believed that the embodiments and their advantages will be understood from the foregoing description, and it will be apparent that various changes may be made thereto without departing from the scope of the disclosure or sacrificing all of its advantages, the examples hereinbefore described merely being illustrative embodiments of the disclosure.

What is claimed is:

1. A casing comprising:
   a first portion;
   a second portion slidably engaged with the first portion; and
   a functional component assembly comprising at least one sensor coupled to the first portion or the second portion, the at least one sensor detecting a distance between the first portion and the second portion;
   wherein the at least one sensor comprises a first sensor and a second sensor, the first sensor is mounted on the first portion, and the second sensor is mounted on the second portion; and
   wherein the functional component assembly further comprises a flash module, a button, and a connecting cable arranged on the second portion; and the connecting cable electrically connects the second sensor, the flash module, and the button to the portable electric device.

2. The casing as claimed in claim 1, wherein the first portion comprises a first top wall, a first peripheral wall, and two latches; the first peripheral wall is connected to a side of the first top wall and has a longer length than the first top wall, thereby an opening is defined between the first top wall and the first peripheral wall; and the two latches extend from the first peripheral wall and are located at two opposite sides of the opening.

3. The casing as claimed in claim 2, wherein the second portion includes a second top wall, a second peripheral wall, and two slots; the second peripheral wall is connected to a side of the second top wall, and has a shorter length than the second top wall; and the two slots are defined in two opposite ends of the second peripheral wall and are aligned with the two latches.

4. The casing as claimed in claim 3, wherein the two slots are detachably engaged with the two latches, and the second top wall extends into the opening, thereby the second portion engaging with the first portion.

5. The casing as claimed in claim 3, wherein the first sensor is coupled to the first peripheral wall and is adjacent to the latch, the second sensor is coupled to the second peripheral wall and is adjacent to the slot, and the first sensor is aligned with the second sensor.

6. A portable electronic device comprising:
   a body defining a data interface on one end;
   a camera module mounted on the body;
   a processor electrically connected to the camera module; and
   a casing comprising:
      a first portion;
      a second portion slidably engaged with the first portion; and
      a functional component assembly comprising at least one sensor coupled to the first portion or the second portion, the sensor electrically connected to the processor;

wherein the at least one sensor comprises a first sensor and a second sensor, the first sensor is mounted on the first portion, and the second sensor is mounted on the second portion;

wherein the at least one sensor detects a distance between the first portion and the second portion, the processor determines whether actuate or disable the camera module according to the distance information from the at least one sensor; and wherein the functional component assembly further comprises a flash module, a button, and a connecting cable arranged on the second portion; the connecting cable electrically connects the second sensor, the flash module, and the button to the processor via the data interface; and the button is configured to control the camera module when photographing.

7. The portable electronic device as claimed in claim 6, wherein the first portion comprises a first top wall, a first peripheral wall, and two latches; the first peripheral wall is connected to a side of the first top wall and has a longer length than the first top wall, thereby an opening is defined between the first top wall and the first peripheral wall; and the two latches extend from the first peripheral wall and are located at two opposite sides of the opening.

8. The portable electronic device as claimed in claim 7, wherein the second portion includes a second top wall, a second peripheral wall, and two slots; and the second peripheral wall is connected to a side of the second top wall, and has a shorter length than the second top wall; the two slots are defined in two opposite ends of the second peripheral wall and are aligned with the two latches.

9. The portable electronic device as claimed in claim 8, wherein the two slots are detachably engaged with the two latches, and the second top wall extends into the opening, thereby the second portion engaging with the first portion.

10. The portable electronic device as claimed in claim 8, wherein the first sensor is coupled to the first peripheral wall and is adjacent to the latch, the second sensor is coupled to the second peripheral wall and is adjacent to the slot, and the first sensor is aligned with the second sensor.

11. The portable electronic device as claimed in claim 9, wherein the body defines a hole on one side, and the camera module is arranged in the hole and the is exposed from the body.

12. The portable electronic device as claimed in claim 11, wherein the first portion covers the camera module and slides away from the second portion, the distance between the first portion and the second portion increases, when the first portion slides to a predetermined position that disposing the camera module, the at least one sensor detects a predetermined distance information and transmits to the processor, and the processor actuates the camera module.

13. The portable electronic device as claimed in claim 12, wherein the first portion slides towards the second portion, and when the first portion slides to cover the camera module, and the processor disables the camera module.

14. The portable electronic device as claimed in claim 11, wherein the connecting cable is electrically connected to the processor via the data interface by extending a metal elastic piece for reaching the data interface and thereby establishing electrical connection.

* * * * *